(12) United States Patent
Raghoebardayal

(10) Patent No.: US 8,934,664 B2
(45) Date of Patent: Jan. 13, 2015

(54) SYSTEM AND METHOD OF ESTIMATING PAGE POSITION

(71) Applicant: Sony Computer Entertainment Europe Limited, London (GB)

(72) Inventor: Sharwin Winesh Raghoebardayal, London (GB)

(73) Assignee: Sony Computer Entertainment Europe Limited (GB)

( * ) Notice: Subject to any disclaimer, the term of this patent is extended or adjusted under 35 U.S.C. 154(b) by 56 days.

(21) Appl. No.: 13/845,927

(22) Filed: Mar. 18, 2013

(65) Prior Publication Data

US 2013/0251199 A1 Sep. 26, 2013

(30) Foreign Application Priority Data

Mar. 22, 2012 (GB) .................................. 1205058.9

(51) Int. Cl.
| | | |
|---|---|---|
| G06K 9/00 | (2006.01) | |
| G06K 9/40 | (2006.01) | |
| G06T 7/00 | (2006.01) | |
| G06T 19/00 | (2011.01) | |

(52) U.S. Cl.
CPC ............... *G06T 7/004* (2013.01); *G06T 19/006* (2013.01); *G06T 7/0044* (2013.01); *G06T 2207/10016* (2013.01); *G06T 2207/10021* (2013.01); *G06T 2207/20061* (2013.01); *G06T 2207/30176* (2013.01); *G06T 2207/30208* (2013.01)
USPC .......................................... 382/100; 382/254

(58) Field of Classification Search
USPC .......................... 382/254, 255, 260, 264, 266
See application file for complete search history.

(56) References Cited

U.S. PATENT DOCUMENTS

| | | | | |
|---|---|---|---|---|
| 5,283,864 A | * | 2/1994 | Knowlton | 715/776 |
| 5,316,341 A | * | 5/1994 | Schwartz | 281/15.1 |
| 5,497,236 A | * | 3/1996 | Wolff et al. | 358/296 |
| 5,969,795 A | * | 10/1999 | Honda | 355/25 |
| 6,101,283 A | * | 8/2000 | Knox | 382/254 |
| 6,330,050 B1 | * | 12/2001 | Takahashi et al. | 355/25 |

(Continued)

FOREIGN PATENT DOCUMENTS

| | | |
|---|---|---|
| EP | 2426641 A1 | 3/2012 |
| WO | 2007105289 A1 | 9/2007 |

OTHER PUBLICATIONS

Extended European Search Report for Application No. GB1205058.9 dated Jul. 20, 2012.

(Continued)

*Primary Examiner* — Alex Liew
(74) *Attorney, Agent, or Firm* — Lerner, David, Littenberg, Krumholz & Mentlik, LLP

(57) ABSTRACT

A method captures a video image frame of a book, estimates a position of at least a first endpoint of the book's spine, applies an edge detection operation to the video image frame to generate an edge image, applies a Hough transform to a first region in the edge image to obtain a plurality of line estimates, and rejects line estimates that do not substantially intersect with an estimated endpoint of the book's spine. For line estimates that are not rejected, detecting one or more clusters of angles of the line estimates with respect to an estimated endpoint of the book's spine, and generating an average angle from the cluster of angles. An average angle is selected, and an angular position of the turning leaf in the book's image responsive to the currently selected average angle is estimated.

18 Claims, 10 Drawing Sheets

(56) References Cited

U.S. PATENT DOCUMENTS

| | | | |
|---|---|---|---|
| 6,408,105 B1* | 6/2002 | Maruo | 382/281 |
| 7,006,708 B1* | 2/2006 | Nako et al. | 382/294 |
| 7,079,265 B2* | 7/2006 | Horie | 358/1.12 |
| 7,298,927 B2* | 11/2007 | Nako et al. | 382/298 |
| 7,477,426 B2* | 1/2009 | Guan et al. | 358/474 |
| 2002/0027672 A1* | 3/2002 | Horie | 358/1.12 |
| 2003/0198398 A1* | 10/2003 | Guan et al. | 382/255 |
| 2006/0188148 A1* | 8/2006 | Nako et al. | 382/162 |
| 2012/0294528 A1* | 11/2012 | Li et al. | 382/173 |
| 2013/0251199 A1* | 9/2013 | Raghoebardayal | 382/103 |

OTHER PUBLICATIONS

European Examination Report for Application No. GB1205058.9 dated Jul. 23, 2012.

* cited by examiner

SYSTEM AND METHOD OF ESTIMATING PAGE POSITION

CROSS REFERENCE TO RELATED APPLICATIONS

The present application claims the benefit of and priority to GB Application No. 1205058.9, filed Mar. 22, 2012, the entire disclosure of which is incorporated by reference herein.

BACKGROUND OF THE INVENTION

1. Field of the invention

The present invention relates to a system and method of estimating page position.

2. Description of the Prior Art

Augmented reality systems are known that use a video camera coupled to a computer to capture a video image, detect features of that captured video image, and then in response to the detected features, generate a graphical overlay to superpose on the captured video image which in some fashion augments the captured video image.

Referring to FIG. 1, in a typical augmented reality application a so-called fiduciary marker 800 of a known size is included in the scene to be captured by the video camera, in order to provide an easily detectable feature.

Fiduciary markers are typically high-contrast (e.g. black and white) and asymmetric patterns, so providing scope for pattern recognition in even relatively poor image capture conditions (e.g. with low resolution image capture, poor lighting, and the like). Such recognition typically provides an estimation of the position (x and y axis position) and rotation (by virtue of the marker's asymmetry) of the fiduciary marker within the captured video image.

Optionally in addition the distance of the fiduciary marker (its z-axis position) from the video camera may be estimated by comparing the size of the fiduciary marker in the captured image with a known size of the fiduciary marker (e.g. its size in pixels at a distance of 1 meter).

Similarly, optionally a tilt of the fiduciary marker (i.e. its deviation from the x-y plane in the z direction) may be estimated by comparing the aspect ratio of the fiduciary marker in the captured image with the known aspect ratio of the fiduciary marker, and/or using other techniques such as detecting foreshortening (where a rectangular shape appears trapezoidal) or other distortions of the fiduciary marker in the captured video image.

The generated graphical overlay typically comprises a virtual graphics element that can then be superposed over the fiduciary marker, with the estimated position, rotation distance and tilt of the fiduciary marker used to modify the virtual graphics element as applicable.

The augmented image is then output to a display.

The subjective effect of this process is that the output video image comprises a graphical element (for example a monster or a castle) in place of the fiduciary marker, typically replicating the estimated position, rotation, distance and tilt of the fiduciary marker.

Alternatively, the fiduciary marker can be used in other ways. For example a graphical object can be positioned relative to the fiduciary marker but not covering it, or the fiduciary marker can be used to identify to an entertainment system or other computer a selected object or region of a scene; for example, placing a fiduciary marker on a table may cause an entertainment system to identify the table (for example by identifying a contiguous region of colour within a tolerance of to the colour found near the fiduciary marker), after which the fiduciary marker can be removed.

However, it will be appreciated that in such augmented reality systems, the user's suspension of disbelief, which makes them complicit in the illusion that the graphical overlay is part of the captured scene, is at least in part dependent upon the reliability with which the graphical overlay matches or interacts with some real-world aspect of the scene. This reliability is frequently dependent upon estimates of the position and orientation of the fiduciary marker within the scene.

Thus it is desirable to reduce the occasions upon which such estimates cannot be reliably made.

SUMMARY OF THE INVENTION

In a first aspect, a method of estimating the angular position of a turning leaf in an image of a book is provided according to claim 1.

In another aspect, an entertainment device for estimating the angular position of a turning leaf in an image of a book is provided according to claim 12.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A system and method of estimating page position are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
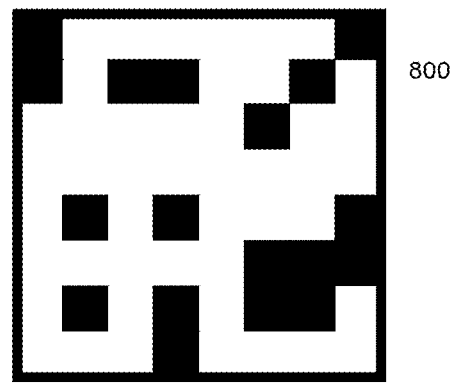
FIG. 1 is a schematic diagram of a fiduciary marker in accordance with an embodiment of the present invention.
Figure 2A:
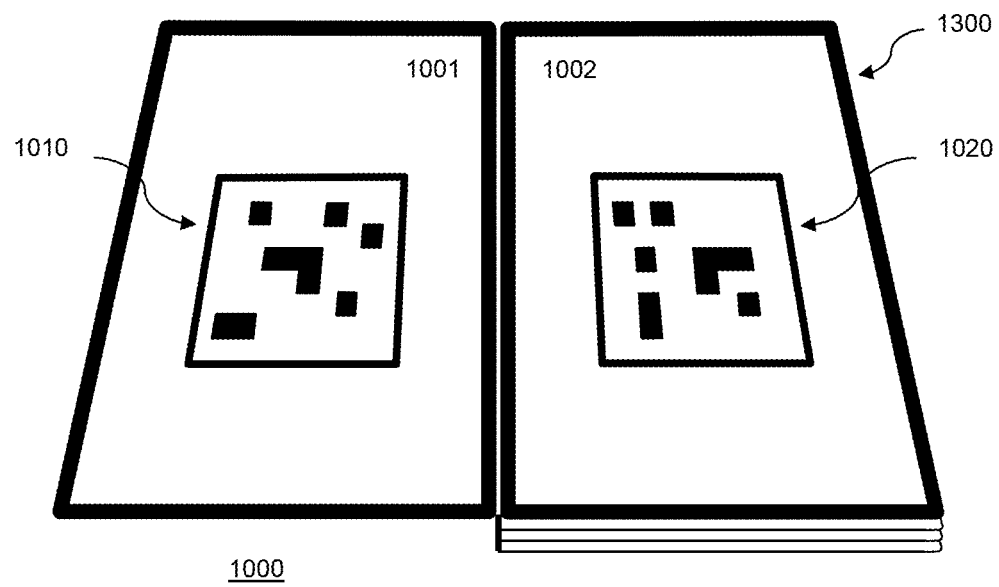
FIG. 2A is a schematic diagram of an image of a book in accordance with an embodiment of the present invention.
Figure 2B:
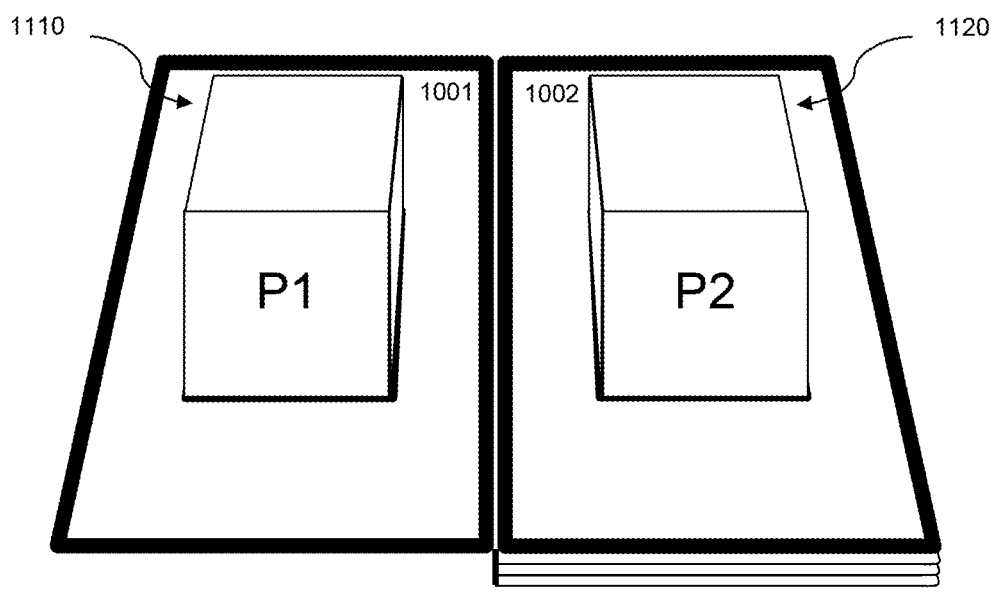
FIG. 2B is a schematic diagram of an image of a book with an augmented reality graphical overlay, in accordance with an embodiment of the present invention.

Referring now to FIGS. 2A and 2B, in an embodiment of the present invention a book 1000 has a plurality of rigid, turnable leaves (a so-called 'board book'), and comprises fiduciary markings on each page 1010, 1020, as shown in FIG. 2A. A leaf will be understood to be a single turnable sheet or panel of a book and typically comprises a page on each side. FIGS. 2A and 2B show, by way of example, pages 1 and 2, labelled 1001 and 1002 respectively. Optionally the inside front and/or back covers of the book may also act as pages and comprise fiduciary markings. Similarly, optionally the outside front and/or back covers may comprise fiduciary markings. In addition, optionally each page is edged with a high contrast marking 1300 to facilitate detection of the extent of the page.

An entertainment device coupled to a video camera can capture an image of the book and use known techniques to detect the fiduciary markings on each visible page and hence locate those pages of the book. Given this information, the entertainment device can augment the captured video image of the book with pop-up virtual graphic elements 1110, 1120 corresponding to placement, scale and orientation of the fiduciary markings 1010, 1020 on the visible pages as shown in FIG. 2B, and output the augmented video image for display. In this way the displayed version of the book becomes a 'magic' pop-up book in which the pages can come to life.

Figure 3:
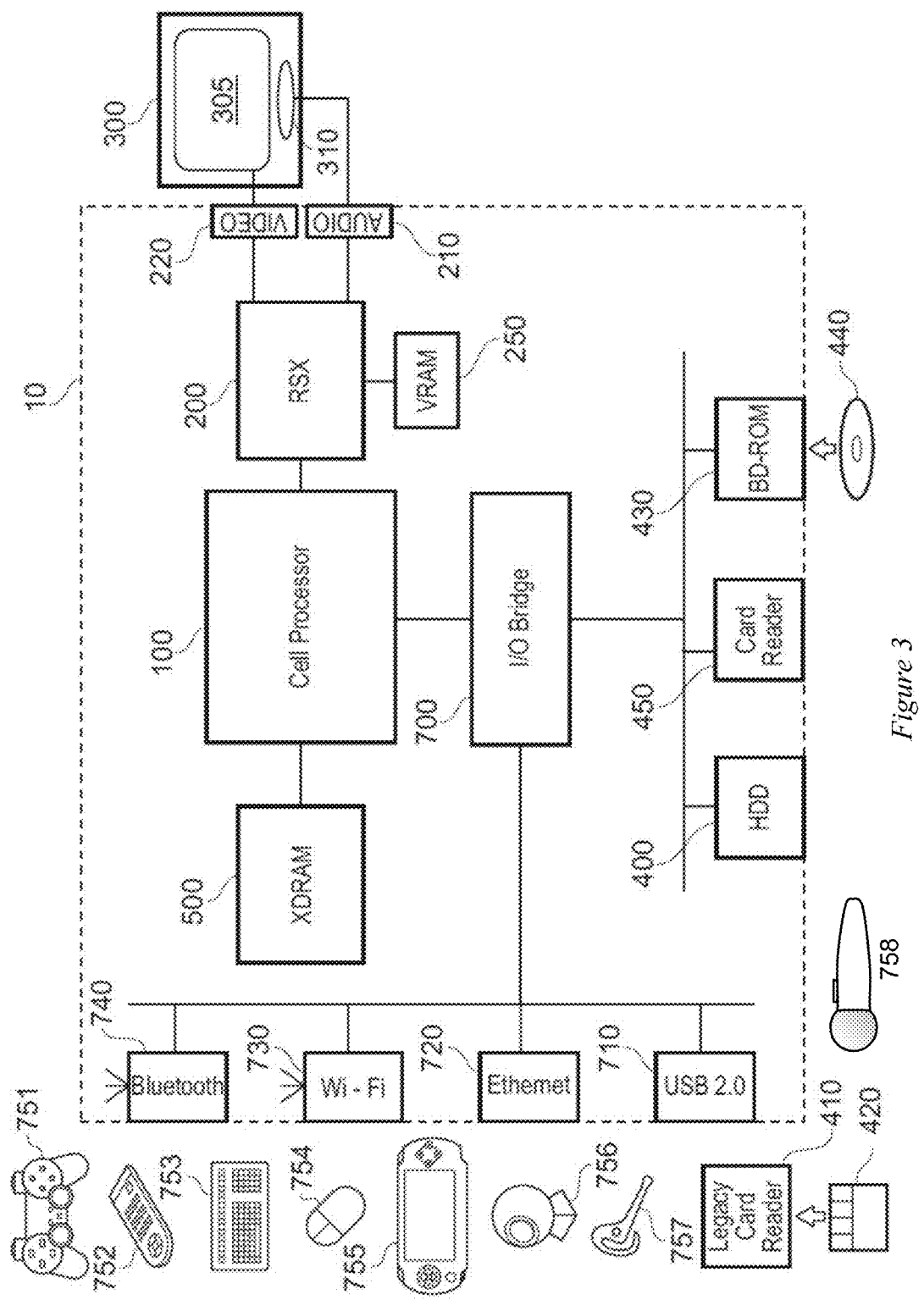
FIG. 3 is a schematic diagram of an entertainment device, in accordance with an embodiment of the present invention.

FIG. 3 schematically illustrates the overall system architecture of a suitable entertainment device known as the Sony® Playstation 3® entertainment device or PS3®. The PS3 comprises a system unit 10, to which various peripheral devices are connectable including a video camera, as detailed below.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit to Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

In particular, these connections enable a video camera such as an EyeToy® video camera 756 (or a stereoscopic video camera, not shown) to be coupled to the PS3 in order to capture a video image (or stereoscopic video image pair) of the book.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the to game controller may be translated as inputs to a game in addition to or instead of conventional button or joystick commands. Optionally, other wirelessly enabled peripheral devices such as the portable entertainment device 755 or the Playstation Move® 758 may be used as a controller. In the case of the portable entertainment device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In embodiments of the video camera, it is stereoscopic. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled person will be aware that a device driver or similar software interface may be required in the present embodiment described.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 4:
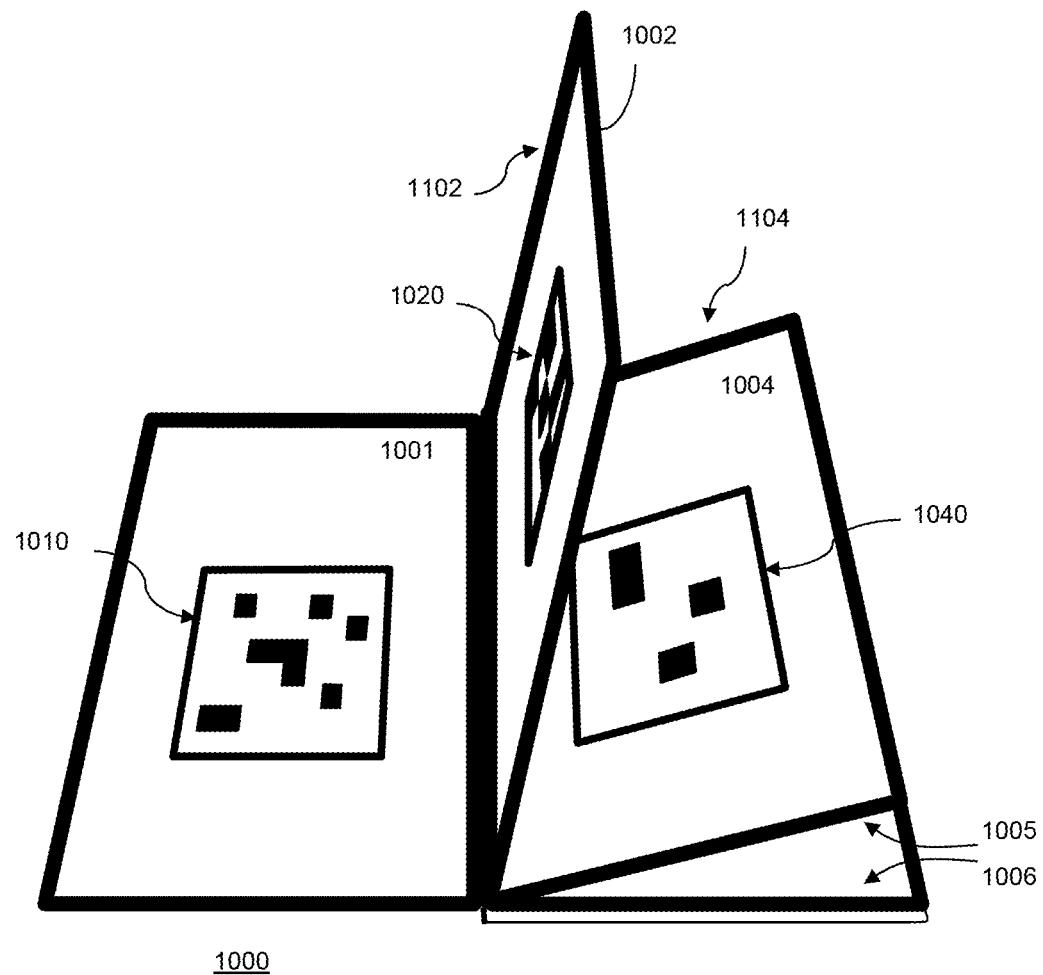
FIG. 4 is a schematic diagram of an image of a book in accordance with an embodiment of the to present invention.

Referring now to FIG. 4, it will be appreciated that whilst the fiduciary markers may be readily detected when the book is laid open and flat, several problems arise from the process of turning leaves of the book.

Firstly, it will be appreciated that as a user turns over a rigid leaf 1102 of the board book 1000, then for example pages 1 and 2 become obscured whilst page 3 (not shown, but located on the face of the leaf 1102 opposite to page 2) and page 4 (1004) are revealed. When the turning action is complete and pages 3 and 4 are fully revealed, the system can provide image augmentation of pages 3 and 4 in a similar manner to that previously described for pages 1 and 2 with reference to FIG. 2B.

However, a first problem that arises is that during the process of turning these pages there comes a point where the fiduciary marker 1020 on page 2 (for example) becomes so distorted by being viewed nearly edge-on to the camera that it is no longer recognisable by the entertainment device. At this point it becomes preferable to use an alternative technique of determining the position of the turning leaf of the book so that any animations dependent upon it (for example a pop-up animation showing objects between pages 1 and 2 folding down) are able to continue appropriately.

Such a technique is described in co-pending European application 10175548.6, incorporated herein by reference. A brief summary of the technique is described below with reference to FIG. 5.

In a first step s10, a scene comprising the book is captured by a video camera or similar image capture device operably coupled to an image input of the PS3 (such as a USB port), resulting in an image including the book. As noted previously, the book itself comprises substantially rigid to leaves.

In a second step s20, the PS3 attempts to detect fiduciary markings in the image (i.e. those visible in the book), for example using the Cell processor operating under suitable software instruction as a marking detector. Typically not all of a fiduciary marker is required to identify it if it comprises some form of spatially distributed redundancy in its markings.

In a third step s30, the image or partial image of the of the fiduciary marker on a page of the book is compared with a reference version of the marker to determine orientation and scale, and given a known physical relationship to the page (i.e. its printed position) this also provides an estimate of the orientation and scale of the book and in particular the placement of the spine of the book, which acts as the origin of rotation for the leaves of the book. Again the Cell processor may perform the comparison and the estimate the placement of the spine of the book, and the reference versions of the markers may be stored in RAM, on the hard disc, on an optical disk or on remote storage, or any other suitable storage medium or combination thereof.

Based upon the origin of rotation coincident with the spine of the book, in a fourth step s40 a plurality of possible positions for a turning leaf of the book are hypothesised. In particular, given the size of the leaf then the positions of the free edges of the leaf are hypothesised. Again here the Cell processor may operate as the hypothesising means.

To provide a basis of comparison with these hypotheses, in a fifth step s50 the captured image is processed to generate an image in which edges are identified. In addition data indicating the directions of these edges is generated. The image processing may be performed by the Cell processor, the Reality Synthesiser graphics unit or a combination of the two.

In a sixth step s60, the hypothesised edges of the turning leaf of the book are each evaluated with respect to the image comprising the identified edges and the directions of these edges using one of several possible scoring criteria as described previously. Again this evaluation or comparison may be performed using the Cell processor operating under suitable software instruction. Typically however, it is not necessary to compare each hypothesised edge with all the pixels of the processed image.

In a seventh step s70, the hypothesis whose predicted free edges of the turning leaf generate the best score is assumed to be the best match to the actual turning leaf's position, with the Cell processor performing the selection of this hypothesis.

Finally in an eighth step s80 a virtual graphic element such as a picture or a polygonal object (e.g. a 2D rendering of a 3D virtual object) is superposed or otherwise incorporated into the captured image to augment it at a position consistent with the winning hypothesis. This image augmentation may be achieved by the Reality Synthesiser graphics unit combining the video and graphical elements, typically according to instructions from the Cell processor. The virtual graphic element itself may be stored locally in RAM, on the hard disc, or on an optical disk, may be remotely stored, or may be the product of a procedural graphics generation process such as a tree growth process.

Figure 5:
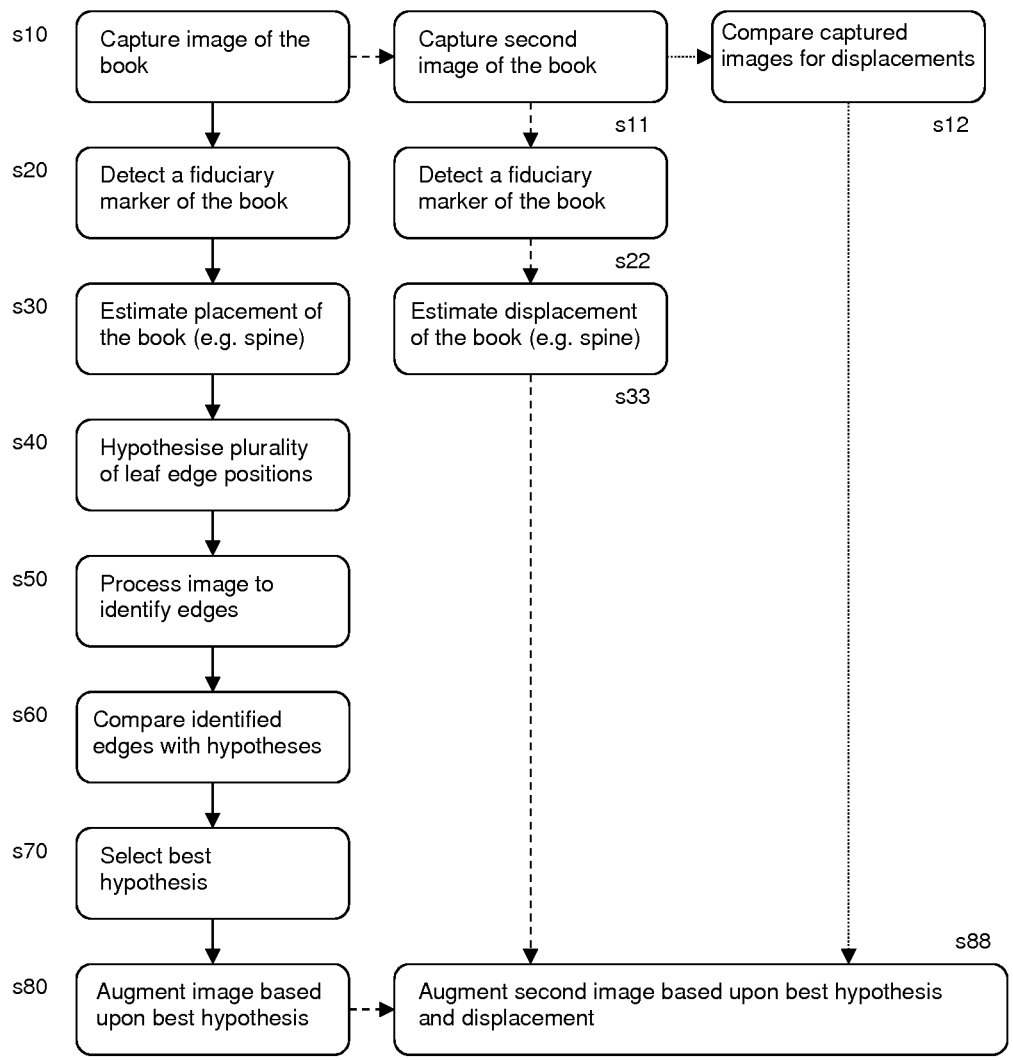
FIG. 5 is a flow diagram of an exemplary method of estimating the angle of a turning leaf of a book.

Other possible steps are shown in FIG. 5 using dashed arrows. These include steps s11, s22, s33, which replicate steps s10, s20, and s30 for a second image of a stereoscopic image pair, and step s88, which replicates step 80 for an offset position (displacement) in the second image. Similarly, using dotted arrows step s12 provides an alternative determination of the displacement to that of s11, s22 and s33 using a direct image comparison for a stereoscopic image pair, for example by the Cell processor. In either case, this enables 3D augmentation for a stereoscopic display.

It will be appreciated that the above steps need not necessarily all be implemented in the above order. For example, the fifth step s50 may occur immediately after the first step s10.

It will be appreciated in general that the fiduciary markers may be used to initially detect the location, scale and orientation of the book, and to identify the page numbers, but then the bold edging of the pages may be used alternately or in addition to the fiduciary markers for frame-by-frame tracking of the book position, with the fiduciary markers only re-appraised periodically or when the Cell processor detects a shape of the page that may be ambiguous and require a non-symmetrical marker to resolve.

Figure 6A:
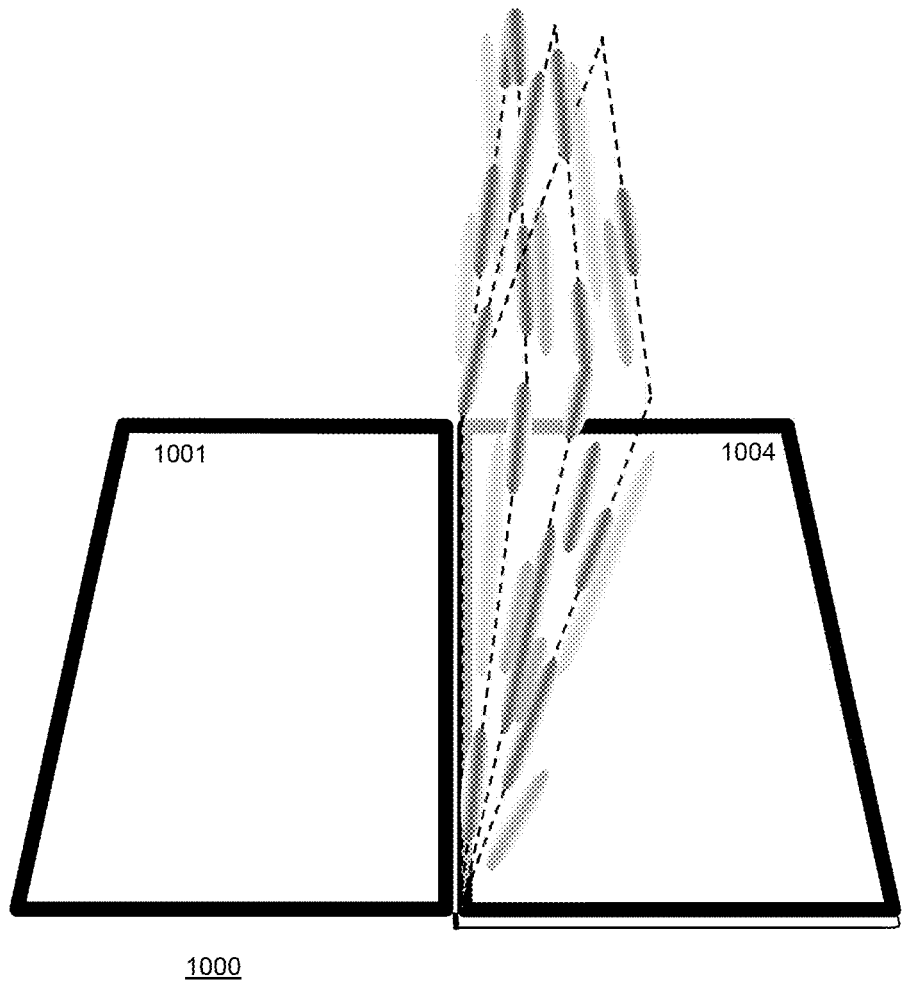
FIG. 6A is a schematic diagram of an image of a book, together with clarifying lines, in accordance with an embodiment of the present invention.
Figure 6B:
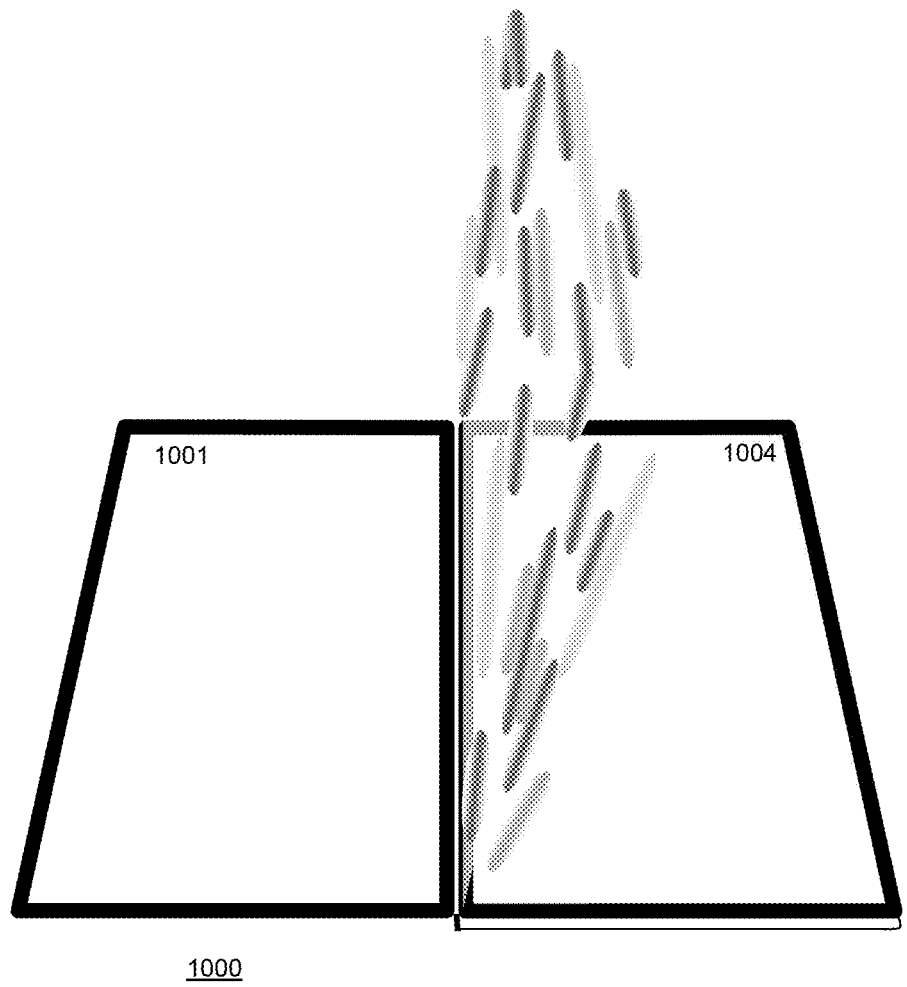
FIG. 6B is a schematic diagram of an image of a book, in accordance with an embodiment of the present invention.

However, referring now also to FIGS. 6A and 6B, it will be appreciated that the above technique may encounter problems when the input image of the turning leaf is corrupted by motion blur. Motion blur may cause a broad smearing of the edge of the turning leaf in the image, with the breadth of the smear being proportional to the angular velocity and hence radius along the leaf with respect to the spine of the book. Alternatively or in addition, depending on how the CCD sensor in the video camera operates, it can also result in a series of partial images of the leaf at different positions.

Both effects are schematically illustrated in FIG. 6A, where blurred partial lines are shown for a plurality of possible page positions in one image, together with several dashed outlines of pages added solely for ease of interpretation. These dashed lines are then omitted in FIG. 6B, which is otherwise identical to FIG. 6A. Note that whilst the fiduciary markers have also been omitted for clarity, they would still be present in the actual book.

Figure 7:
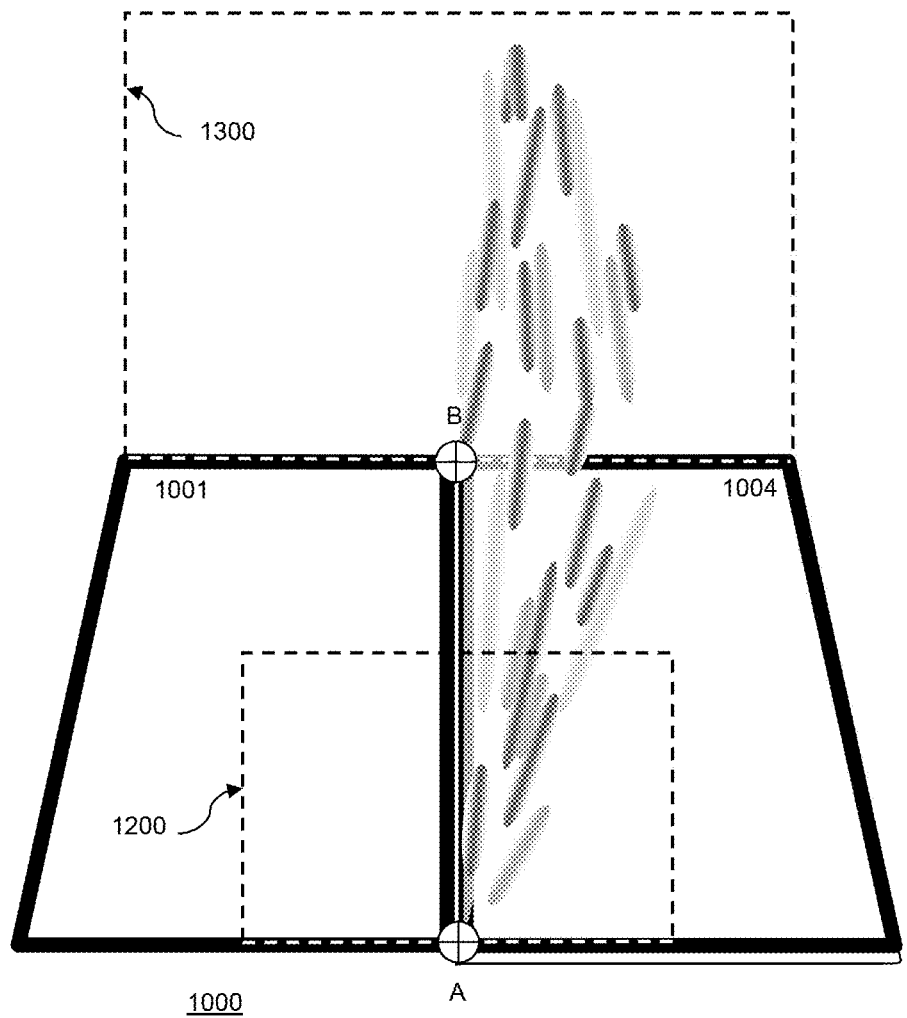
FIG. 7 is a schematic diagram of an image of a book, together with analysis regions, in accordance with an embodiment of the present invention.

Consequently, referring now also to FIG. 7, in an embodiment of the present invention the angular position of the turning leaf in a video image frame is estimated as described below.

Firstly, the video image frame of the book is captured as described previously. For the purposes of explanation, it is assumed that the resulting image comprises motion blur artefacts relating to the turning leaf.

As noted above, during the turning of the leaf typically at least one main fiduciary marker will be visible, enabling the PS3 to estimate the position, orientation and scale of the fiduciary marker with respect to an internally held reference model, and hence also the position, orientation and scale of the book, given a known physical relationship between the marker and the book.

In particular, it enables the PS3 to estimate the position of at least a first endpoint (A, B) of the spine of the book. Preferably, at least the end point of the spine of the book facing towards (or at least, closest to) the camera (A).

This may be done before or after an edge detection operation is applied to the video image frame of the book to generate an edge image. Such edge detection may be applied as part of the analysis of the main fiduciary marker, and the resulting edge image may be re-used in the following analysis.

Alternatively, the edge image used as part of the analysis of the main fiduciary marker may be discarded and a second edge detection process may be applied. Hence for example an over sensitive edge detection may be applied that does not thin the edges in the image, such as a suitably configured Sobel operator.

In either case, in the resulting edge image, at least a first region (1200, 1300) of the edge image is subjected to further analysis. Preferably the or each region has its lower boundary centred upon the endpoint of one of the spines of the book (A, B), as shown in FIG. 7. Hence if only one region (1200) is used, preferably its lower boundary is centred on the spine endpoint closest to the camera (A).

Thus in an embodiment of the present invention, if only one region (1200) of the video image is analysed, this first region sits on the endpoint of the spine closest to the camera (A). In general the first region is selected to have a vertical extent smaller than the vertical extent of the book within the video image frame, and typically also a horizontal extent smaller than the horizontal extent of the book within the video image frame. As a non-limiting example, the first region may be roughly equivalent to one quarter to one half of the visible page size of the book. This has the benefit that the first region is likely to only capture image features generated from the book itself, and hence will be less likely to contain spurious results.

However, if two regions of the video image are analysed, the second region (1300) sits on the endpoint of the spine furthest from the camera (B). This second region may be of a similar size to the first region, or may instead have a greater vertical and horizontal extent. As a non-limiting example, the second region may extend across the width of the open book and encompass the height of the turning page when orthogonal to the open book, as shown in FIG. 7.

Within the or each region, a Hough transform is applied to the edge image to obtain a plurality of line estimates.

The Hough transform estimates a parametric description of a line from a series of points. The traditional parametric description of a line is y=mx+c, where y and x are abscissa, m is the gradient and c is the offset. However, for vertical lines this results in an infinite value for m, and hence is computationally inefficient. Consequently, an equivalent formulation in polar co-ordinates avoids this problem, which can be written as $$y = \left(-\frac{\cos\theta}{\sin\theta}\right)x + \left(\frac{r}{\sin\theta}\right) \qquad \text{Equation 1}$$

Figure 8:
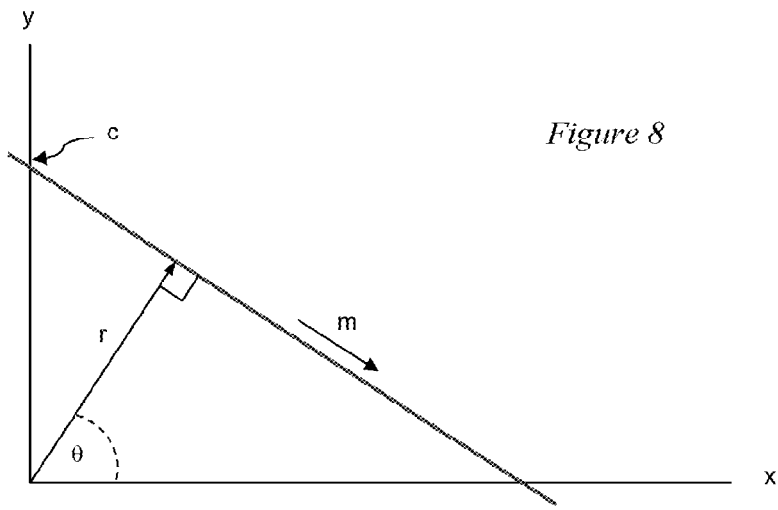
FIG. 8 is a schematic diagram of a line in accordance with an embodiment of the present invention.

FIG. 8 shows both m, c, r and θ for an example line.

The Hough transform can be used to detect a line formed by a pixel and its neighbours (whether or not these are contiguous) by calculating the intersections of the curve r(θ)=$x_i$·cos θ+$y_i$·sin θ for each pixel position $x_i$, $y_i$. The point of intersection in the (r, θ) space (also known as 'Hough space') characterises their common line.

The result is a set of candidate lines expressed as points in (r, θ) space. Some of these lines will to relate to edges deriving from partial or blurred images of the turning leaf, whilst some are likely to relate to edges of the fiduciary markers on the flat (non-turning) pages of the book if these are wholly or partially captured in the analysis region. For the analysis region centred on the endpoint of the spine furthest from the video camera, it is also likely that lines relating to the background of the image will be detected.

In an embodiment of the invention, those lines that do not substantially intersect with the book spine endpoint associated with the analysis region are rejected.

In an embodiment of the present invention this is simplified by setting the origin of the (r, θ) space as the position of the spine endpoint when applying the Hough transform. Therefore if the line passes through the spine endpoint and hence the origin, then using Equation 1 and setting x to zero, a line exactly intersecting with the origin should also have a value of y that is zero. It will be further appreciated from Equation 1 that in this circumstance the value of y is proportional to the value of r. Consequently any line where r is greater than an absolute predetermined threshold (representing a predetermined tolerance to lines not exactly intersecting with the origin) can be rejected, or conversely if r is less that this threshold then the line can be kept.

Other options for determining whether a line passes through a predetermined point are known in the art and may be similarly used for this purpose.

The remaining lines for each analysis region may then be characterised as having different angles with respect to the origin at the respective spine end point. A set of such angles corresponding to the remaining lines for one analysis region may thus be:

50 73 74 74 75 75 76 77 105 106 106 106 107 107 107 107 107 107 108 108 108 108 108 108 108 108 108 108 108 109 109 109 109 110 110 111 135

Within this set there are (in this example) two clusters of angles; one comprising 7 values in the 73-77 degree range and one comprising 28 values in the 105-111 range. In addition there are some outliers (50 and 135 degrees).

Using a known clustering algorithm (such as for example K-means clustering), the first N to clusters in the set of angles may be found. N may be for example 1, 2, 3, 4 or 5. Optionally known techniques to remove outlier values from these clusters may then also be employed, such as removing values that differ by more than M times the standard deviation of the cluster from the cluster mean, where M may for example be in the range 1.0 to 2.0.

The average values of the resulting clusters are then calculated. In the above example, these are 75 degrees and 108 degrees. These average angles from the or each cluster of line estimates are then candidates for the angle of the turning leaf of the book.

In an embodiment of the present invention, where the Hough transform and subsequent processes described above were performed for both a first (1200) and second (1300) analysis region, such candidate average angles may then be rejected in one region if there is no corresponding average angle in the other region, within a predetermined threshold of angular deviation. Thus in the above example, the average value of 75 degrees found in the first analysis region may be discarded if there is not a corresponding average value in the range 70 to 80 degrees found in the second analysis region. The threshold of angular tolerance can be empirically determined, but may typically fall within the range ±1 degrees to ±10 degrees.

This is based upon the assumption that the book is a board book, and so the turning leaf is substantially stiff; in this circumstance it can be expected that the front and rear edges of the leaf will have substantially the same angle with respect to the spine at any given moment (subject to foreshortening effects of the camera lens which may be compensated for in the estimation process), and hence should give rise to similar average angles after analysis.

Out of the remaining candidate average line estimates, one is then selected as the basis for estimating the angular position of the turning leaf in the image of the book, responsive to that currently selected average line estimate.

In an embodiment of the present invention, the selection is of the average angle that most closely approximates the angular position of the turning leaf as estimated for the preceding video image frame. This is based upon the assumption that the intra-frame change in position of the turning leaf will not be large, even for a rapidly turning leaf.

This selection method may be refined by predicting the angular position of the leaf in the current video image based upon the angular difference between estimates in preceding frames, and then selecting the average angle closest to the prediction.

This selection method may be initialised by firstly selecting the most acute non-horizontal average angle remaining at the selection stage, as this is indicative of a newly turning leaf.

By contrast, in an embodiment of the present invention, the selection is of the average angle remaining at the selection stage that corresponds to the largest cluster of angles found in the analysis regions.

In this case the selection may be subject to the largest cluster being a predetermined multiple greater than the next largest cluster, to provide a predetermined confidence level in the selection.

The above two selection techniques can interact such that there is a weighting between candidate average angles that decreases with the angular deviation from the previous selection or expected position for the first selection scheme, and increases with the multiple between cluster sizes for the second selection scheme, such that where confidence in the outcome of the first selection scheme is outweighed by confidence in the section selection scheme, the second selection scheme is used. This enables to system to respond flexibly to sudden movements of the turning leaf that are likely in the scenarios in which the invention is most applicable.

In either case, optionally in the series of angle selections over the course of turning the book may be initialised but not acted upon (used to augment the book image) until the angle of the turning leaf relative to the horizontal (or equivalently to the flat open book) has exceeded a threshold angle, such as 15 or 165 degrees, depending on the direction the leaf is being turned.

Similarly in either case, optionally where angular estimates from the first and second analysis regions are within the predetermined angular tolerance but nevertheless differ, the step of selecting a respective average angle comprises weighting selections in favour of average angles that substantially intersect with the endpoint of the spine of the book that is closest to the camera within the video image frame.

In other words, if the average angle of the chosen cluster is 108 degrees in the first region and 110 in the second region, either the average from the first region is used, or a combined average weighted in favour for the first region is used, for example resulting in a new average of 108.5 degrees. This is because it is generally anticipated that the first analysis region (1200) will have to the cleaner and better image to estimate angles from.

The selected average angle is then used as the basis for estimating the angular position of the turning leaf in the image of the book, as noted previously.

Meanwhile the other average angles are discarded. It will be appreciated that clusters giving rise to the rejected average angles may have been caused for example by lines detected in response to shadows of the turning leaf falling on the pages of the book, lines of the fiduciary markers in the book itself, fingers holding the turning leaf, other shadows from the user or elements of the environment, and noise.

In addition it will be appreciated that the open flat book itself may generate lines at the bottom of each analysis regions (1200, 1300) that will intersect with the spine endpoints. These however will be at angles substantially at 0 and 180 degrees (or more generally, at angles known to correspond to the current configuration of the book, whether wholly flat or not) and can hence be discounted.

Hence also more generally references herein to 'horizontal' and to various angles may be understood to be with respect to the flat leaves of the book in its current configuration within the captured image, and computed from reference to the fiduciary marker(s) and any other tracking of the book that is employed.

Figure 9:
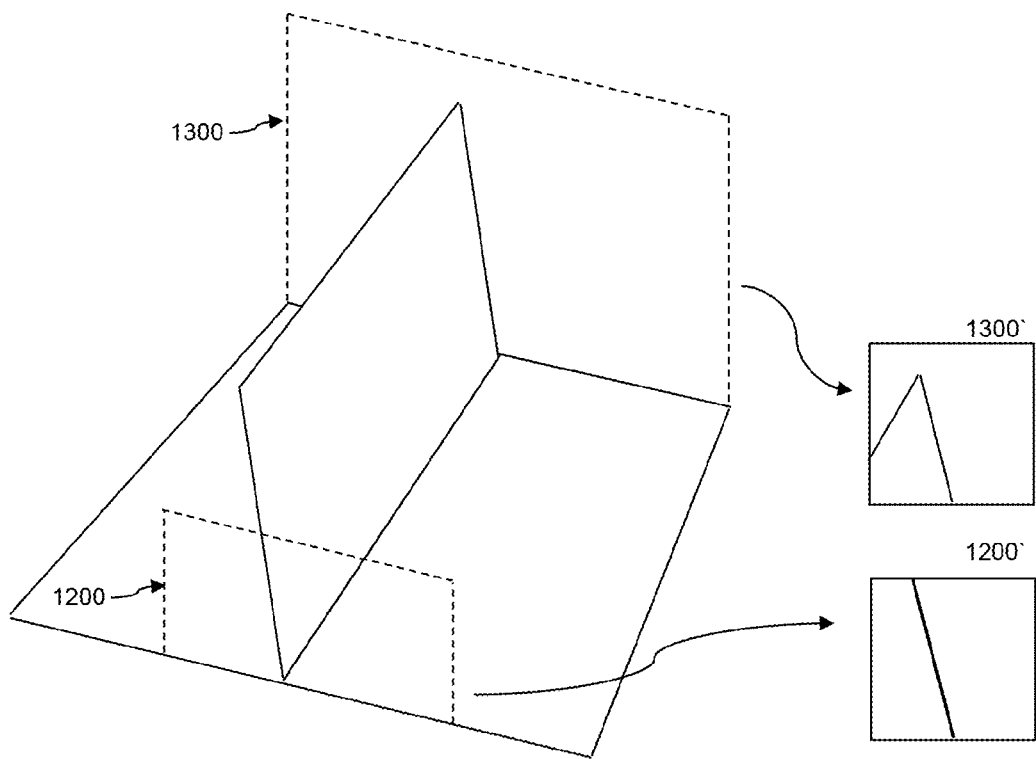
FIG. 9 is a schematic diagram of an image of a book, together with analysis regions and transformations of the analysis regions, in accordance with an embodiment of the present invention.

Referring now also to FIG. 9, in an embodiment of the present invention, the or each analysis region undergoes a spatial transformation prior to applying the Hough transform.

It will be appreciated that the book as depicted in the captured image has an unconstrained relationship with respect to the camera, and consequently is likely to be at an arbitrary position and orientation. This position and orientation (and scale) are estimated from the fiduciary marker(s) visible on the book, as noted previously. Consequently however, the true angle of the turning leaf of the book is in effect also rotated with respect to the image by the orientation of the book with respect to the image.

The orientation of the book is estimated with respect to a reference orientation, which is typically face-on to the flat page of the book (as the reference fiduciary markers are typically internally represented in this fashion). Similarly the scale of the book is estimated with respect to the internal representation of the markers.

Consequently, using this information, it is possible to rotate and scale the analysis region or regions so that they are at a consistent relative angle and scale on a frame-by-frame basis. In the example shown in FIG. 9, the first region 1200 and the second region 1300 are rotated in 3D space to place the front and rear edges of the book, respectively, horizontal, and to make the size of the spaces identical, in transformed first region 1200' and transformed second region 1300'. It will be appreciated that the transformation could omit changes to the scaling of the regions is wished.

The Hough transform is then applied to the transformed region(s). This in turn makes comparisons with previous angular estimates (and between the first and second regions) simpler and more consistent between image frames.

It will be appreciated that when both the first and second regions are being rotated in this manner, the angular information extracted from both transformed regions can cross-validated to estimate confidence in, and increase robustness of, the angular estimates. As discussed previously, where angular estimates in each region have no corresponding estimate in the other region, for a given tolerance, then they can be discarded.

Hence more generally, the PS3 estimates the orientation of the book with respect to a reference orientation, and derives a transformational mapping between these orientations, and then transforms the or each region to a predetermined orientation based upon the derived mapping, prior to applying the Hough transform.

Notably, the transform can optionally be applied to the input image prior to applying an edge detection operator to the transformed regions, so that the rotation and transformation of the analysis region does not affect the edge image used for the Hough transform.

Notably, transformation of the analysis regions to a predetermined orientation also simplifies processing if a pair of input images is obtained from a stereoscopic camera; in this case each camera will capture an image of the book from a slightly different orientation, and respective transformations can be applied to normalise these orientations to a predetermined orientation. In this case, comparisons and cross-referencing of average angles optionally also be performed between analysis regions of the left and right images; for example, an average angle may be to retained in the first analysis region if there is a corresponding average angle within a predetermined angular tolerance in the corresponding other first analysis region. Similarly, optionally clusters of angles from line estimates from corresponding left and right analysis regions could be combined to generate more robust average angles.

In any event, once the angle of the turning leaf has been estimated, then the generation and superposition of augmented reality content over the turning leaf may be performed. In addition to being oriented, positioned and scaled with respect to the position of the book and the estimated angle of the leaf in the book, such augmentations may also be modified responsive to the angle as follows:

Optionally, the augmented graphics may represent a structure that spans two pages and hence is itself responsive to the relative angle between such pages; examples may include the animation of a pop-up element unfolding in a manner similar to physical pop-up books, or animating a character pushing the page open, or a structure that distorts in response to the relative angle between the pages, such as an animation of a spider web or slime being stretched out.

Optionally, the augmented graphics may be processed to have apparent motion blur themselves, based upon the change of estimated angle between successive video frames and hence apparent speed. This can help to make the graphics look more realistic, and to better blend with the captured video.

Figure 10:
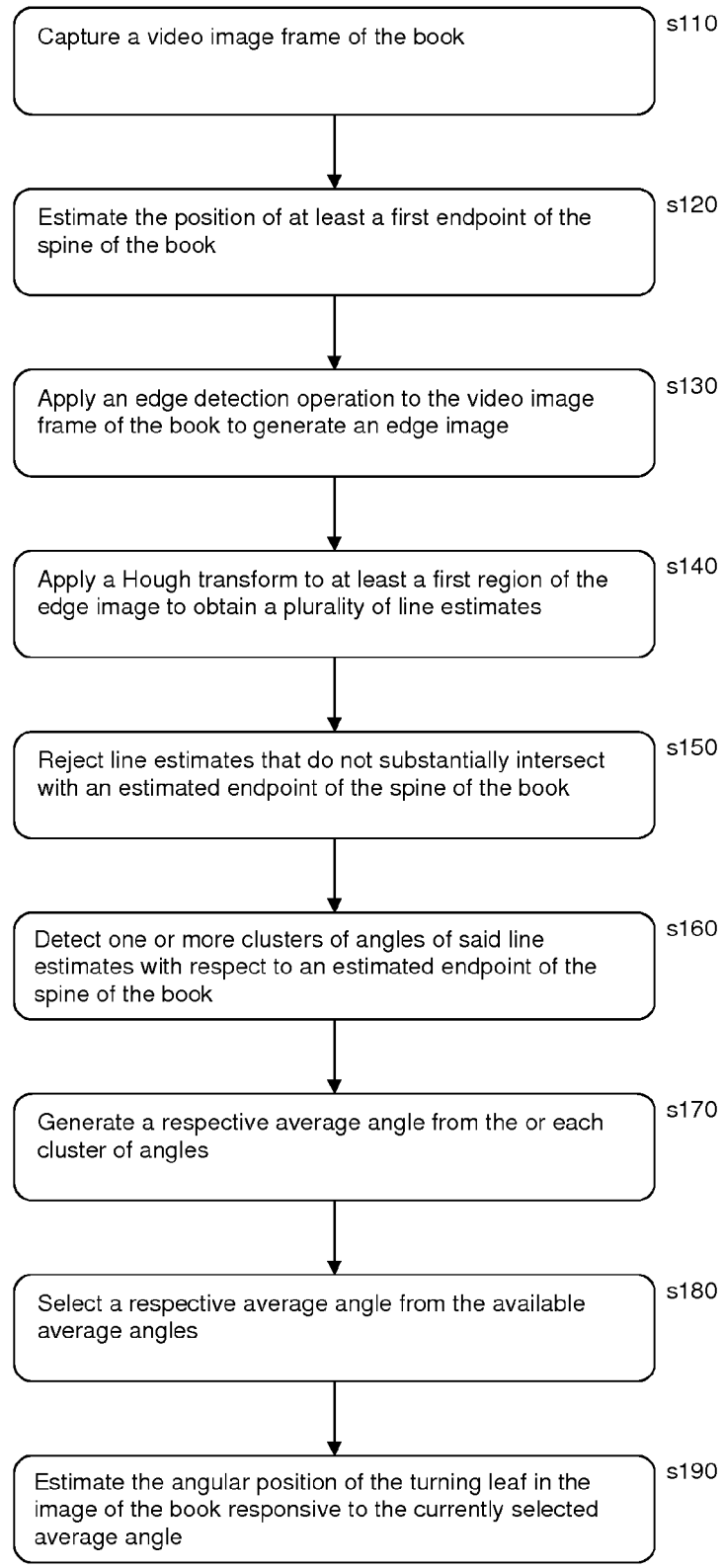
FIG. 10 is a flow diagram of a method of estimating the angle of a turning leaf of a book.

Finally referring to FIG. 10, in a summary embodiment of the present invention, a method of estimating the angular position of a turning leaf in an image of a book comprises:

In a first step s110, capturing a video image frame of the book;

In a second step s120, estimating the position of at least a first endpoint of the spine of the book;

In a third step s130, applying an edge detection operation to the video image frame of the book to generate an edge image;

In a fourth step s140, applying a Hough transform to at least a first region of the edge image to obtain a plurality of line estimates;

In a fifth step s150, rejecting line estimates that do not substantially intersect with an estimated endpoint of the spine of the book;

for line estimates that are not rejected, in a sixth step s160, detecting one or more clusters of angles of said line estimates with respect to an estimated endpoint of the spine of the book, and in a seventh step s170, generating a respective average angle from the or each cluster of angles;

then in an eighth step s180, selecting a respective average angle from the available average angles; and in a ninth step s190, estimating the angular position of the turning leaf in the image of the book responsive to the currently selected average angle.

It will be apparent to a person skilled in the art that variations in the above method corresponding to the various embodiments described and claimed herein are also considered within the scope of the present invention.

As noted above, the PS3 operating under suitable software instruction is operable as an entertainment device for such estimation of the angular position of a turning leaf in an image of a book. Hence the PS3 may comprise input means such as USB 710 or WiFi 730 for receiving a captured video image frame of a book from a video camera such as the EyeToy 756. It may also comprise an image processor, such as the Cell processor 100 and/or RSX processor 200 operating singly or in tandem to estimate the position of at least a first endpoint of the spine of the book, and operable to apply an edge detection operation to the video image frame of the book to generate an edge image. The Cell processor and/or RSX may also act as an image analyser operable to apply a Hough transform to at least a first region of the edge image to obtain a plurality of line estimates, and as a processor operable to reject line estimates that do not substantially intersect with an estimated endpoint of the spine of the book. For line estimates that are not rejected, this processor is operable to detect one or more clusters of angles of said line estimates with respect to an estimated endpoint of the spine of the book, and to generate a respective average angle from the or each cluster of angles. The Cell processor and/or RSX may then act as a selector operable to select a respective average angle from the available average angles, and an estimator operable to estimate the angular position of the turning leaf in the image of the book responsive to the currently selected average angle.

These functions of the PS3 may then further operate as described herein. In particular, the selector is operable to select the average angle that most closely approximates the angular position of the turning leaf estimated for the preceding video image frame. Meanwhile the image processor may be operable to apply the spatial transformations to the analysis regions described previously.

Hence it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or in the form of a transmission via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Although illustrative embodiments of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

I claim:

1. A method of estimating an angular position of a turning leaf in an image of a book, comprising the steps of:
   capturing a video image frame of the book;
   estimating a position of at least a first endpoint of a spine of the book;
   applying an edge detection operation to the video image frame of the book to generate an edge image;
   defining a first region having its lower boundary centred upon the first endpoint of the spine of the book;
   applying a Hough transform to the first region in the edge image to obtain a plurality of line estimates;
   rejecting line estimates that do not substantially intersect with an estimated endpoint of the spine of the book;
   for line estimates that are not rejected:
      detecting one or more clusters of angles of said line estimates with respect to the estimated endpoint of the spine of the book, and
      generating a respective average angle from each of the one or more clusters of angles;
   selecting a respective average angle from the respective average angles; and
   estimating the angular position of the turning leaf in the image of the book responsive to the selected average angle.

2. A method according to claim 1, in which the step of selecting the respective average angle comprises selecting an average angle that most closely approximates the angular position of the turning leaf estimated for a preceding video image frame.

3. A method according to claim 1, in which the step of selecting the respective average angle comprises selecting an average angle corresponding to a largest cluster of angles.

4. A method according to claim 1, in which the step of selecting the respective average angle comprises weighting selections in favour of average angles that substantially intersect with the endpoint of the spine of the book that is closest to a camera within the video image frame.

5. A method according to claim 1, in which an origin of a Hough space used when applying the Hough transform is set as a position of the first endpoint of the spine of the book.

6. A method according to claim 1, in which the first region has a vertical extent smaller than the vertical extent of the book within the video image frame.

7. A method according to claim 1, in which a second region has its lower boundary centred upon a second endpoint of the spine of the book that is farthest from a camera within the video image frame.

8. A method according to claim 7, comprising the step of rejecting an average angle generated for one of the first and second regions if there is no corresponding average angle in the other one of the first and second regions within a predetermined threshold of angular deviation.

9. A method according to claim 1, comprising the steps of:
estimating an orientation of the book with respect to a reference orientation and deriving a transformational mapping between these orientations; and
transforming the first region to a predetermined orientation based upon the derived mapping, prior to applying the Hough transform.

10. A method according to claim 1 in which angular estimates for a turning leaf outside of a predetermined range up to between 15° to 165° with respect to a substantially flat open book are rejected.

11. A non-transitory computer program product comprising computer program instructions that when followed by a processor implement the steps of:
capturing a video image frame of a book;
estimating a position of at least a first endpoint of a spine of the book;
applying an edge detection operation to the video image frame of the book to generate an edge image;
defining a first region having its lower boundary centred upon the first endpoint of the spine of the book;
applying a Hough transform to the first region in the edge image to obtain a plurality of line estimates;
rejecting line estimates that do not substantially intersect with an estimated endpoint of the spine of the book;
for line estimates that are not rejected:
   detecting one or more clusters of angles of said line estimates with respect to the estimated endpoint of the spine of the book, and
   generating a respective average angle from each of the one or more clusters of angles;
selecting a respective average angle from the respective average angles; and
estimating the angular position of the turning leaf in the image of the book responsive to the selected average angle.

12. An entertainment device for estimating the angular position of a turning leaf in an image of a book, comprising:
input means for receiving a captured video image frame of the book;
an image processor operable to estimate a position of at least a first endpoint of a spine of the book, and operable to apply an edge detection operation to the video image frame of the book to generate an edge image;
a processor operable to define a first region having its lower boundary centred upon the first endpoint of the spine of the book;
an image analyser operable to apply a Hough transform to the first region in the edge image to obtain a plurality of line estimates;
a processor operable to reject line estimates that do not substantially intersect with an estimated endpoint of the spine of the book, and for line estimates that are not rejected, operable to detect one or more clusters of angles of said line estimates with respect to an estimated endpoint of the spine of the book, and to generate a respective average angle from each of the one or more clusters of angles;
a selector operable to select a respective average angle from the respective average angles; and
an estimator operable to estimate the angular position of the turning leaf in the image of the book responsive to the selected average angle.

13. The entertainment device of claim 12, in which the selector is operable to select an average angle that most closely approximates the angular position of the turning leaf estimated for a preceding video image frame.

14. The entertainment device of claim 12, in which the first region has its lower boundary centred upon the endpoint of the spine of the book that is closest to the camera within the video image frame.

15. The entertainment device of claim 12, in which:
the image processor is operable to estimate the orientation of the book with respect to a reference orientation and to derive a transformational mapping between these orientations; and
the image analyser is operable to transform the first region of the edge image back to the reference orientation based upon the derived mapping, prior to applying the Hough transform.

16. The entertainment device of claim 13, in which the first region has its lower boundary centred upon the endpoint of the spine of the book that is closest to the camera within the video image frame.

17. The entertainment device of claim 13, in which:
the image processor is operable to estimate the orientation of the book with respect to a reference orientation and to derive a transformational mapping between these orientations; and
the image analyser is operable to transform the first region of the edge image back to the reference orientation based upon the derived mapping, prior to applying the Hough transform.

18. The entertainment device of claim 14, in which:
the image processor is operable to estimate the orientation of the book with respect to a reference orientation and to derive a transformational mapping between these orientations; and
the image analyser is operable to transform the first region of the edge image back to the reference orientation based upon the derived mapping, prior to applying the Hough transform.

* * * * *